United States Patent Office 3,252,830
Patented May 24, 1966

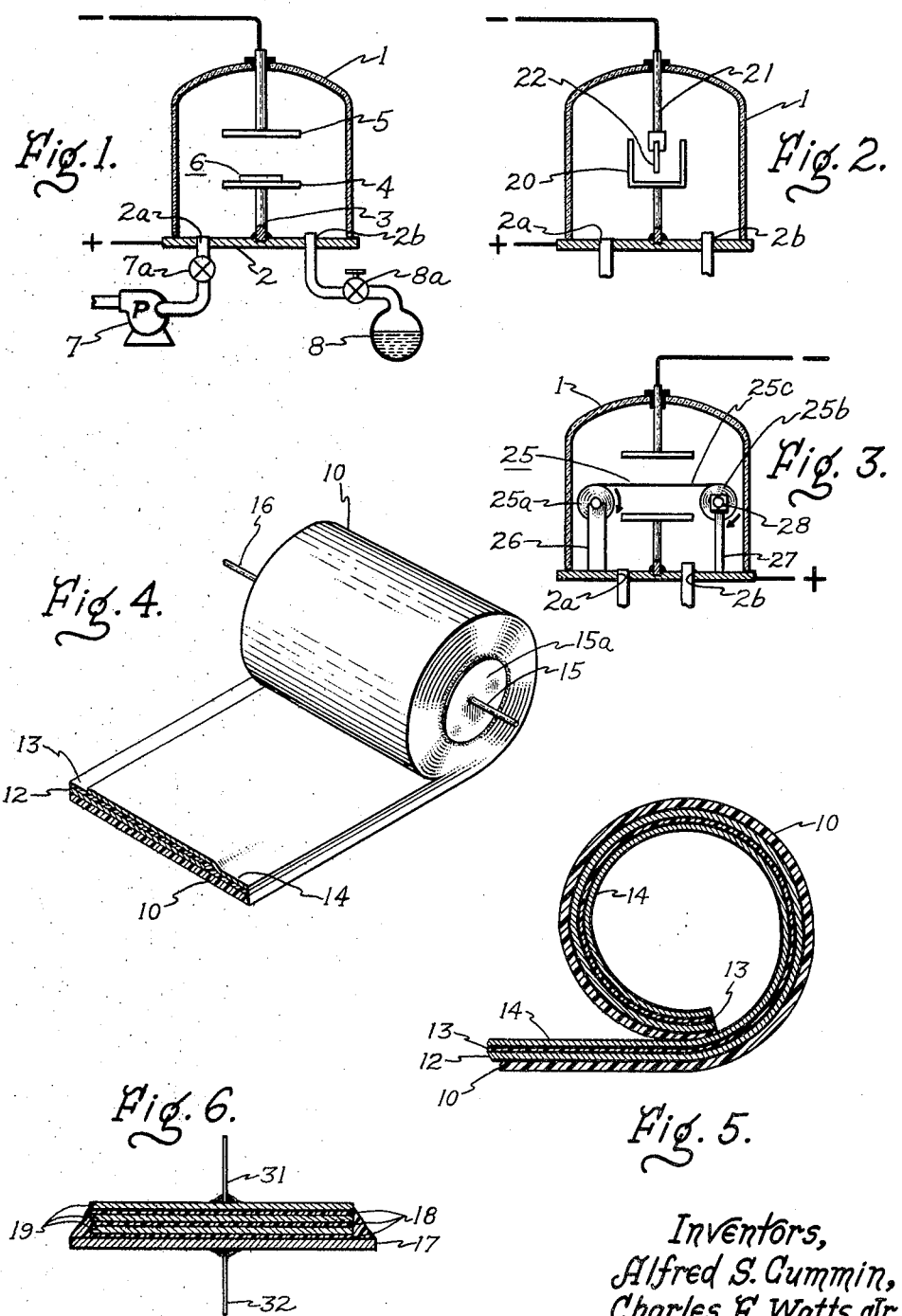
Inventors,
Alfred S. Cummin,
Charles E. Watts, Jr.,
by Gilbert P. Tarleton
Their Attorney.

3,252,830
ELECTRIC CAPACITOR AND METHOD FOR MAKING THE SAME
Alfred S. Cummin, Buffalo, and Charles E. Watts, Jr., Lake George, N.Y., assignors to General Electric Company, a corporation of New York
Filed Mar. 5, 1958, Ser. No. 719,441
4 Claims. (Cl. 117—217)

The present invention relates to electric capacitors, and more particularly to a method of making extremely thin dielectric films and to capacitors embodying such films as dielectric spacers. The capacitors concerned in the invention are those of the so-called dielectric or non-electrolytic type, wherein the capacitor armatures are separated solely by dielectric material.

In the past, considerable effort has been directed in the capacitor field to provide capacitors of increased capacity per unit volume, particularly in view of the need for extremely small units in various electrical applications, or for substantially increasing the capacity of units without correspondingly increasing their physical size. As well known to those skilled in the art, the capacitance of a capacitor is a function of the thickness of the dielectric spacer between the electrodes, i.e., the thinner the dielectric film, the greater the capacitance of the unit.

While various attempts have been made heretofore to produce dielectric films of reduced thickness to increase the capacitance of the units, in practice the thinness of dielectric films of suitable electrical properties has been limited by a number of factors. For example, sheets of cellulose paper, which have been conventionally used as capacitor dielectric spacers, have not been found satisfactory in thicknesses below about 0.2 mil. Thinner paper sheets have presented difficulties in manufacture and handling, and of particular significance are the poor electrical properties of very thin paper sheets. Even in the above-mentioned thickness, it has been found necessary to use several plies of such paper sheets in making a capacitor in order to avoid the possibility of short circuits due to imperfections in the individual sheets. Synthetic resin films have also been used as dielectric spacers, but these sheets have also been found limited in practice to a minimum thickness of the order of 0.2 mil, due likewise to difficulties in manufacture and handling and to the presence of an excessive number of electrically weak areas in sheets which are of lesser thickness. As a result, substantial reduction in the size of capacitor units below conventional dimensions has been strictly limited.

It is an object of the invention to provide electric capacitors having considerably increased capacitance per unit volume as compared to prior art types of capacitors.

It is another object of the invention to provide capacitor dielectric films which are considerably thinner than those conventionally used in the prior art, and a convenient method of readily producing such dielectric films.

It is a further objects of the invention to provide electric capacitors of high capacitance per unit volume which also possess improved high temperature stability and which are operable over a wide temperature range, viz., from −55° C. to 200° C. or more.

The above objects are attained in accordance with the invention by the production of ultra thin dielectric organic polymeric films which are of the order of thickness of about .01 to 1 micron and which are employed in electric capacitors to provide capacitor units having markedly increased capacitance per unit volume due to the extreme thinness of the dielectric spacers between the capacitor electrodes. Such thin dielectric films are produced in accordance with the invention by subjecting an organic monomer of the composition hereinafter more fully disclosed in vaporized or gaseous condition to an electrical glow discharge produced under certain conditions in an evacuated chamber, and forming a deposit of the thus treated organic monomer as a thin continuous solid polymeric film on a suitable supporting surface. The supporting member on which the dielectric film is deposited advantageously serves as a component of the capacitor in which the dielectric film is incorporated.

The invention will be better understood from the following description taken in conjuntion with the accompanying drawing, in which:

FIG. 1 is a diagrammatic view of a form of apparatus which may be employed in forming the dielectric films of the present invention;

FIG. 2 is a similar view of a different form of apparatus for producing the dielectric films;

FIG. 3 is a view of still another embodiment of apparatus which may be employed in carrying out the invention;

FIG. 4 is a view of a partially unrolled wound capacitor assembly incorporating the dielectric films produced in accordance with the invention;

FIG. 5 is a sectional view of a partially rolled capacitor unit formed of the composite material of the FIG. 4 device showing in greater detail the relationship of the parts in the wound roll; and FIG. 6 is a sectional view of a different embodiment of a capacitor incorporating the dielectric films of the invention.

The process of forming ultra thin dielectric films in accordance with the invention involves the type of electrical activation of compositions known as a glow discharge, which is produced between spaced electrodes under certain conditions of gaseous pressure and electrical potential. The glow discharge phenomenon thus referred to is essentially different from the corona or arcing type discharges which occur at pressures substantially higher than those employed in the present invention, as described hereinafter. The glow discharge spreads rather uniformly through the zone between the electrodes and consequently acts more uniformly on all portions of the vaporized or gaseous material in that zone than in the case of discharges of corona or arcing type.

As a result of subjecting polymerizable organic monomers to the action of such glow discharges in an evacuated chamber, there is formed on a suitable support in the chamber an exceedingly thin polymerized continuous film, which is characterized by excellent electrical, physical and chemical properties making it eminently suitable for use as a dielectric spacer in capacitors. The polymeric films have been found to be generally insoluble and infusible, and in particular they possess unusual stability at elevated temperatures, enabling capacitors to be made which may be satisfactorily operated over a temperature range of −55° C. to 200° C. and higher.

Referring now to the drawings, and particularly to FIG. 1, there is shown a type of apparatus which may be used for preparing the present thin dielectric films by the glow discharge process. The apparatus comprises a bell jar 1 resting on a base 2 in air-tight relationship therewith. A support 3 is mounted on base 2 and has an upper portion 4 serving as one electrode of the electrical discharge device, electrode 4 being connected via the conductive support 3 and base plate 2 to a source of high voltage current.

A second electrode 5 suitably spaced from electrode 4 is mounted in the top of jar 1, its stem passing through a suitably sealed aperture in the jar and being exteriorly connected to the source of high voltage current. Electrode 4 has a flat upper surface on which may be placed a sheet or substrate 6 of any suitable material on which the thin dielectric film is to be deposited. Formed in base plate 2 is an aperture 2a communicating with a pump 7 via valve 7a for evacuating the interior of jar 1. Also connected with the interior of enclosure 1 through aperture 2b is a supply vessel 8 containing a polymerizable monomer to be subjected to the electrical glow discharge process. The vapor flow of the monomer in vessel 8 to the interior of jar 1 is suitably controlled by valve 8a.

In carrying out a typical process using the described apparatus, the pump 7 and control valve 7a are operated so as to evacuate the interior of jar 1 and to maintain a pressure of, say, about 20 microns of mercury. A high voltage current at about 1000 volts D.C. is then applied to the electrodes to thereby establish a visible glow discharge between the electrodes 4 and 5. As the vapor of the volatilized organic monomer is brought into the area of glow discharge, the material begins to polymerize immediately and this action continues during the period of exposure of the material to the discharge. As the monomer polymerizes, it forms a very thin film of the polymerized organic material on the substrate 6 resting on electrode 4.

The current used in the process may be either A.C. or D.C., but D.C. is generally preferred because the glow discharge resulting therefrom is more restricted in area than that produced by A.C. and allows better control of the deposition of the polymeric material on the substrate.

The voltage used may vary over a relatively wide range, depending on such factors as the spacing between electrodes, the area and shape of the electrodes, and the pressure in the reaction vessel, as well as the particular monomer used. In a particular apparatus of the type shown in FIG. 1 wherein disc-shaped electrodes 4 inches in diameter spaced about 16 millimeters apart were used, a voltage range of about 300 to 2000 volts was found satisfactory. Increased voltages would be used with greater spacing of the electrodes, and operations have been successfully carried out with voltages as high as 30,000 volts A.C. The current being dependent on the voltage in accordance with Ohm's law, control of the voltage as described above will inherently result in control of the current also.

The pressure maintained in the evacuated chamber during the process of deposition is such that a uniform glow discharge is obtained, and this varies depending upon the particular monomer used. In general, to provide a glow discharge over a sufficient area to produce the dielectric films of the invention, it is preferred to use a range of pressure of about 1 to 1,000 microns of mercury, with an optimum range being about 10–100 microns. An excessively low pressure would result in insufficient vapor of the organic material being retained in the chamber to produce the desired glow discharge, whereas an excessively high pressure would also hinder the formation of the necessary glow discharge condition.

Generally speaking, the attainment of the proper conditions for carrying out the present process is determined in practice chiefly by the production of a visible glow discharge in the area between the electrodes.

The substrate on which the dielectric film is to be deposited may be on or form part of either the anode or cathode, or alternatively it may be entirely independent and spaced apart from both electrodes. It is only necessary in accordance with the invention that the substrate be arranged within the region in which the glow discharge is produced.

The monomeric materials which may be used to produce satisfactory ultra thin dielectric films may be selected from a wide variety of polymerizable organic materials in gaseous, solid or liquid form.

The present process for making capacitor dielectric films is particularly effective when organic compounds containing aromatic and/or aliphatic unsaturation are employed. For example, benzene, which is an aromatic organic compound, is readily polymerized to an insoluable and infusible polymeric resin by the action of the glow discharge. Similarly, other aromatic compounds such as toluene, fluorobenzene, chlorobenzene, p-xylene, o-fluorotoluene, m-fluorotoluene and aniline may be used.

Other compounds useful in the invention containing both aromatic and aliphatic unsaturation include styrene, divinylbenzene, m-trifluoromethylstyrene, α-methylstyrene, p-chlorostyrene, p-fluorostyrene, phenyl acetylene and phenyl butadiene. Aliphatic unsaturated compounds which are applicable include ethylene, acetylene, butadiene, cyclopentadiene, isoprene, propylene, 1-butene, vinyl chloride, vinylidene chloride, vinylidene fluoride, acrylonitrile, trifluorochloroethylene and tetrafluoroethylene.

The monomeric materials may contain amine, halogen, alkyl and other substituents.

As used herein, the term "monomer" is intended to mean a molecule or compound of relatively low molecular weight and simple structure which is capable under the influence of a glow discharge of conversion into polymer form by combination with itself or similar molecules or compounds.

It is possible in accordance with the invention to provide a mixture of two or more monomers simply by supplying the vapors of the several materials simultaneously to the glow discharge chamber.

It is also possible to control the rate of polymerization as well as to extend the upper pressure limit at which acceptable films can be produced by using an inert carrier gas such as nitrogen, helium or argon, i.e., operating the glow discharge process with a partial pressure of carrier gas along with the organic monomer vapors. Operating at higher pressures in this fashion reduces some of the requirements placed on the vacuum producing apparatus.

It has been found possible using the described process to produce satisfactory dielectric films having a thickness, in particular, of less than .5 micron and of the overall range of the order of .01 to 1 micron. Relatively thicker films have been found in general to be less desirable, due among other things to their relative brittleness or to the formation of ripples or folds in the film which causes non-uniform thicknesses.

In making a capacitor using the above-mentioned thin films as the dielectric material, it is convenient to incorporate the filmed substrate as a part of the capacitor. To this end, the substrate sheet 6 shown in FIG. 1 may be constituted by a film of suitable synthetic resin, such as poly (ethylene terephthalate), poly (tetrafluoroethylene), poly (trifluorochloroethylene), cellulose acetate or other similar type of electrical insulating material, the synthetic resin sheet having its surface metallized with a layer of suitable electrode material, such as aluminum. The dielectric film is then deposited on the substrate as hereinabove described, and the surface of the film is subjected to a metallizing treatment to provide a second electrode layer. Preferably, the electrode layers are offset laterally from each other toward opposite edges of the composite sheet by masking or other procedures in accordance with known practice.

While the substrate may be arranged at either electrode in the glow discharge apparatus, it has been found that certain advantages are obtained by arranging the substrate at the cathode rather than at the anode. In particular, it appears that the dielectric film is deposited more rapidly in the cathode area, so that a shorter period of exposure to the glow discharge is adequate to produce films of equivalent thickness as compared to the case when the substrate is in the anodic region. It is also of advantage to employ electrodes of particular configuration to facilitate deposition of the dielectric film. FIG. 2 shows a preferred form of apparatus incorporating the above features. In the illustrated device there are provided in a vacuum jar 1, which is similar to that of FIG. 1, anode 20 of U-shaped configuration and cathode 21 having substrate sheet 22 secured thereto, the parts being arranged with substrate 22 extending into anode 20 substantially midway between its arms. Substrate 22 may be either a metallic sheet or an insulating sheet with metallized surfaces on both sides. Such an arrangement enables the dielectric film to be deposited on both sides of the substrate simultaneously, thus conserving time, power and labor in the production of the capacitor.

To provide a roll-type capacitor using the apparatus of FIGS. 1 or 2, the substrate may be in strip form, so that the resultant composite sheet produced can be convolutely wound to provide a rolled capacitor section. Where substrate strips are required having a length greater than can be conveniently accommodated in unwound condition in the vacuum vessel, the arrangement shown in FIG. 3 is of advantage. In this device, substrate strip 25 in rolled form at opposite ends as shown is mounted on suitable supports 26, 27 in vessel 1. During the glow discharge deposition process the substrate 25 is unreeled from one roll 25a while being reeled on the other roll 25b so as to continuously expose a surface portion 25c to the glow discharge action. The winding of the substrate 25 during the process may be accomplished by any suitable means, such as by a spring wound motor means 28, or equivalent arrangement, mounted adjacent to the substrate roll for rotating an axial shaft or the like therein.

A convolutely wound rolled capacitor section which can be formed from a film-deposited substrate of the present invention is shown in FIGS. 4 and 5. As illustrated therein, the capacitor is composed of a base supporting sheet 10 of synthetic resin having a metallized electrode layer 12 overlying its surface with one edge of layer 12 spaced from one side of the base sheet. Dielectric film 13, which is deposited by the present glow discharge process on the metallized substrate, entirely covers electrode 12 in a very thin, continuous layer. This dielectric layer in turn has metallized thereon electrode layer 14 which is offset from the opposite side of the composite sheet. There is thus formed a capacitor structure having a pair of electrodes with interposed thin dielectric sheet, which may be rolled up to form a very small capacitor having an extremely high capacitance in relation to its volume.

As will be understood, the relative thicknesses of the component layers would not in practice correspond to those shown, the individual layers being illustrated in exaggerated dimensions merely for the purpose of clarity. Actually, the dielectric film would typically be of the order of $\frac{1}{200}$ of the thickness of the base insulating sheet, with the metallized layer being of a thickness intermediate the other two sheets.

Leads 15 and 16 each with a disc terminal 15a are secured to the opposite ends of the capacitor roll in electrical contact with the respective electrode layers. For this purpose, suitable conductive bonding material, such as silver paint or synthetic resin adhesive containing conductive material, may be employed.

Alternatively, leads 15 and 16 may be secured to the capacitor roll by being initially inserted in the center of the roll as it is being wound, the inserted portions being suitably insulated from the roll and each other, and after the roll is formed the respective leads 15 and 16 are secured by a metal spraying (Schooping) process or other suitable means to the corresponding electrode layer edges exposed at opposite ends of the capacitor roll.

FIG. 6 illustrates another embodiment of a capacitor which may be produced in accordance with the invention. In this form, the ultra thin dielectric film instead of being deposited on a metallized insulating base is initially formed by the described glow discharge process on a conductive base such as an aluminum foil or other metallic sheet which may serve as one of the electrodes in the assembled capacitor. Thereafter, alternating metallized layers and dielectric films are deposited on the base structure to build up a capacitor of desired properties. The series type multi-layer capacitor shown in FIG. 6 may thus be constituted by a substrate 17 of metal with ultra thin organic dielectric films 18 and metallized layers 19, with suitable leads 31 and 32 being respectively secured to the outermost metallic layers.

While only two types of capacitors have been shown, it will be evident to those skilled in the art that the capacitor could take various forms of other rolled, flat or multi-layer construction to provide desired properties and to serve for particular applications. For example, for a high capacity low voltage unit a parallel connected flat multi-layer capacitor may be used, whereas for high voltage capacity purposes, a multi-layer series connected unit such as shown in FIG. 6 could be employed.

The following examples are illustrative of the present process of making capacitors in accordance with the invention, it being understood that the invention is not intended to be limited thereby:

*Example I*

A strip of polyethylene terephthalate film 1 mil thick was initially metallized on one side with an aluminum layer about 2 microns thick offset from one edge of the strip. Using m-fluorotoluene as the monomer, a polymer film 0.2 micron in thickness was deposited in a glow discharge process on the metallized surface of the base insulation strip. In this process, a voltage of 500 volts D.C. at an electrode spacing of 16 mm. was applied, under a pressure in an evacuated chamber of 14 microns mercury. Upon the initial dielectric film thus formed, there was metallized a layer of aluminum of about 2 microns in thickness offset from the opposite edge of the base strip. The composite sheet thus formed was rolled around a pair of leads which were thereafter secured electrically to the ends of the finished roll by a metal spraying process, as previously described. The rolled capacitor was then tested at 25° C. and found to have a capacity at 1000 cycles per second of 0.3 microfarad, the power factor was .25%, and the capacitor withstood a voltage of at least 20 volts D.C.

*Example II*

A number of single dielectric layer stamp type capacitors were formed by a glow discharge deposition of an ultra thin film of polymerized m-fluorotoluene about .2 micron thick on an aluminum base plate. In this process, the D.C. voltage applied for the glow discharge reaction was 1000 volts at a pressure in the chamber of about 18 microns. On the thus formed dielectric film, a layer of aluminum about 2 microns thick was deposited in a metallizing operation. Life tests made on these capacitors under conditions of 150° C. and 32 volts D.C. showed that no deterioration occurred after 5000 hours from the initial average capacitance of .05 microfarad and 0.8% dissipation factor measured at 150° C. which characterized these units. Tests made after 1100 hours showed the average insulation resistance of these units to be about 3000 megohm microfarads as measured at 150° C. and 31 volts D.C. Calculations based on the above values and a measured dielectric constant of 4 showed that the dielectric film had an average resistivity of at least about $10^{14}$ ohm-centimeters. Thermal cycling tests of these units ranging from 150° C. to −55° C. produced no substantial change in their initial characteristics.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. The method of making an electrical capacitor which comprises subjecting the vapor of a material comprising a fluorine-containing monomer to an electrical glow discharge, depositing a thin, solid, continuous polymeric film composed of said material on a base by exposing said base to the thus-treated vapor, and arranging the thus-formed polymeric film as the dielectric between capacitor electrodes of opposite polarity.

2. An electrical capacitor produced by the method defined in claim 1.

3. An electrical capacitor produced by the method defined in claim 1, wherein said fluorine-containing monomer is a fluorinated aromatic compound selected from the group consisting of fluorobenzene and fluorotoluene.

4. An electrical capacitor produced by the method defined in claim 1, wherein said fluorine-containing monomer is composed of a fluorinated ethylene compound selected from the group consisting of trifluorochloroethylene, tetrafluoroethylene and vinylidene fluoride.

References Cited by the Examiner

UNITED STATES PATENTS

| | | | |
|---|---|---|---|
| 1,784,611 | 12/1930 | Polyanyi. | |
| 2,257,411 | 9/1941 | Berghaus et al. | 204—192 |
| 2,535,030 | 12/1950 | Balsbaugh | 317—258 |
| 2,551,035 | 5/1951 | Miller | 204—168 XR |
| 2,614,524 | 10/1952 | Haynes | 317—261 |
| 2,636,855 | 4/1953 | Schwarz | 204—192 |
| 2,676,145 | 4/1954 | Weisz et al. | 204—169 XR |
| 2,734,478 | 2/1956 | Reynolds | 317—258 |
| 2,754,230 | 7/1956 | McLean | 317—258 |
| 2,759,854 | 8/1956 | Kilbey. | |
| 2,778,793 | 1/1957 | Thomas et al. | 204—165 |
| 2,796,397 | 6/1957 | Clasen | 204—165 |
| 2,798,900 | 7/1957 | Davis | 317—258 |
| 2,802,187 | 8/1957 | Evans | 336—200 |
| 2,932,591 | 4/1960 | Goodman | 117—201 |

FOREIGN PATENTS 206,972   1/1957   Austrailia.

OTHER REFERENCES

"About Thin Layers of Hydrocarbons Formed by Electron or Ion Bombardment," H. Konig and G. Helwig, Zeitschrift fur Physic 129, pp. 491–496, 1951.

RICHARD D. NEVIUS, *Primary Examiner.*

SAMUEL BERNSTEIN, JOHN H. MACK, JOSEPH B. SPENCER, *Examiners.*